United States Patent
Seib et al.

(10) Patent No.: US 9,249,887 B2
(45) Date of Patent: Feb. 2, 2016

(54) LOW DEFLECTION BI-METAL ROTOR SEALS

(75) Inventors: David C. Seib, Olean, NY (US); Mark Joseph Kuzdzal, Allegany, NY (US)

(73) Assignee: Dresser-Rand Company, Olean, NY (US)

( * ) Notice: Subject to any disclaimer, the term of this patent is extended or adjusted under 35 U.S.C. 154(b) by 102 days.

(21) Appl. No.: 12/849,356

(22) Filed: Aug. 3, 2010

(65) Prior Publication Data

US 2012/0032404 A1 Feb. 9, 2012

(51) Int. Cl.
| | |
|---|---|
| *F16J 15/44* | (2006.01) |
| *B23K 20/02* | (2006.01) |
| *B23K 20/08* | (2006.01) |
| *B23K 20/227* | (2006.01) |
| *B23K 26/34* | (2014.01) |
| *B23K 31/02* | (2006.01) |
| *B23K 26/32* | (2014.01) |

(52) U.S. Cl.
CPC ............. *F16J 15/443* (2013.01); *B23K 20/021* (2013.01); *B23K 20/085* (2013.01); *B23K 20/2275* (2013.01); *B23K 26/32* (2013.01); *B23K 26/324* (2013.01); *B23K 26/34* (2013.01); *B23K 31/02* (2013.01); *B23K 2201/06* (2013.01); *B23K 2203/08* (2013.01); *B23K 2203/10* (2013.01); *B23K 2203/18* (2013.01); *B23K 2203/20* (2013.01); *B23K 2203/30* (2015.10); *B23K 2203/50* (2015.10)

(58) Field of Classification Search
USPC ......... 277/411, 422, 409, 412, 415, 500, 504, 277/459, 462, 463
See application file for complete search history.

(56) References Cited

U.S. PATENT DOCUMENTS

| | | | | | |
|---|---|---|---|---|---|
| 3,462,159 | A | * | 8/1969 | Baumann et al. | 277/422 |
| 4,146,237 | A | * | 3/1979 | Bergman | 277/514 |
| 4,486,024 | A | | 12/1984 | Cooper | |
| 4,560,175 | A | * | 12/1985 | Kar et al. | 175/371 |
| 4,669,955 | A | * | 6/1987 | Pellow | 415/173.4 |
| 4,824,123 | A | * | 4/1989 | Chia et al. | 277/382 |
| 4,916,892 | A | * | 4/1990 | Pope | 60/772 |
| 5,211,407 | A | | 5/1993 | Glynn et al. | |
| 5,333,993 | A | | 8/1994 | Stueber et al. | |

(Continued)

FOREIGN PATENT DOCUMENTS

| | | |
|---|---|---|
| EP | 0573928 A1 | 12/1993 |
| JP | 04263058 A | 9/1992 |

(Continued)

OTHER PUBLICATIONS

PCT/US2011/037115 International Search Report and Written Opinion dated Jan. 19, 2012 (12 pages).

(Continued)

*Primary Examiner* — Kristina Fulton
*Assistant Examiner* — Eugene G Byrd
(74) *Attorney, Agent, or Firm* — Edmonds & Nolte, PC

(57) ABSTRACT

A seal assembly for use in a turbomachine is provided. The seal assembly has an annular division wall with outside and inside surfaces, a carrier ring disposed adjacent the inside surface of the annular division wall, and a sealing substrate metallurgically-bonded to an inner-most surface of the carrier ring. The sealing substrate is machined to form a seal surface that can be disposed proximate a rotor and maintained substantially parallel thereto during operation of the turbomachine.

17 Claims, 2 Drawing Sheets

(56) References Cited

U.S. PATENT DOCUMENTS

| | | | |
|---|---|---|---|
| 5,639,212 A | 6/1997 | Schaefer et al. | |
| 5,641,280 A | 6/1997 | Timuska | |
| 5,655,782 A | 8/1997 | Takabe et al. | |
| 5,704,759 A * | 1/1998 | Draskovich et al. | 415/170.1 |
| 6,547,522 B2 | 4/2003 | Turnquist et al. | |
| 6,913,266 B2 * | 7/2005 | Jarchau et al. | 277/500 |
| 7,059,829 B2 | 6/2006 | Garner | |
| 7,425,114 B2 | 9/2008 | Schnieders et al. | |
| 7,455,890 B2 | 11/2008 | Darolia et al. | |
| 7,510,370 B2 * | 3/2009 | Strangman et al. | 415/173.4 |
| 7,757,599 B2 * | 7/2010 | Adolfsson | 92/86.5 |
| 7,802,974 B2 | 9/2010 | Rockwell et al. | |
| 7,845,921 B2 | 12/2010 | Prior | |
| 7,997,858 B2 * | 8/2011 | Mikulec | 415/174.3 |
| 8,020,638 B2 * | 9/2011 | Chellappa et al. | 175/371 |
| 8,096,774 B2 * | 1/2012 | Frankenstein et al. | 416/174 |
| 8,147,178 B2 | 4/2012 | Ottaviano et al. | |
| 8,650,753 B2 | 2/2014 | Sellars et al. | |
| 2005/0079343 A1 * | 4/2005 | Raybould et al. | 428/336 |
| 2005/0194071 A1 | 9/2005 | Takayama et al. | |
| 2009/0110550 A1 | 4/2009 | Tani et al. | |
| 2009/0243222 A1 * | 10/2009 | Pisseloup | 277/422 |
| 2009/0324401 A1 | 12/2009 | Calla | |

FOREIGN PATENT DOCUMENTS

| | | |
|---|---|---|
| JP | 08103856 A | 4/1996 |
| JP | 2000303802 A | 10/2000 |
| JP | 2003065076 A | 3/2003 |
| JP | 2007162482 A | 6/2007 |

OTHER PUBLICATIONS

PCT/US11/37115—Written Opinion of the International Preliminary Examining Authority, dated Mar. 4, 2013, 7 pages.

PCT/US11/37115—Notification of Transmittal of International Preliminary Report on Patentability, International Preliminary Report on Patentability, dated Aug. 27, 2013, 19 pages.

PCT/US2011/037115—International Preliminary Report on Patentability, Written Opinion of the International Searching Authority, dated Feb. 5, 2013, 8 pages.

* cited by examiner

LOW DEFLECTION BI-METAL ROTOR SEALS

BACKGROUND

A typical rotor seal assembly in a turbomachine is disposed between a stationary casing and a rotating shaft, where the rotating shaft penetrates an annular division wall that seats a sealing member at its inner-most diameter. A carrier ring is typically interposed between the division wall and the sealing member, thereby providing a connection device that allows for the replacement and/or upgrade of the seal without having to replace the whole division wall. Although many varying types of seals can be used, normally labyrinth, damper, and/or hole pattern seals are used in such applications. In operation, the face of the seal is disposed generally parallel to the shaft and configured to separate a high-pressure cavity from a low-pressure cavity, thereby minimizing the loss of pressurized fluids through the tight clearance defined between the shaft and the seal.

Elevated pressures, however, can deflect the division wall and cause a "coning" effect on the seal assembly. Coning occurs when the inner-most diameter of the seal assembly proximate the shaft is deflected by the pressures in the high-pressure region toward the low-pressure region, thereby diverging the seal face from its parallel disposition with the shaft. In this diverged disposition, the seal inlet creates a choking effect and the seal outlet acts like a diffuser, both of which phenomena can significantly alter seal characteristics and introduce rotor dynamic instability. Coning is enhanced by the connection joint between the carrier ring and the seal, which is typically a T-slot or similar rail fitting that can have a significant amount of play therebetween. As the pressure increases on one side of the seal assembly, the play between the carrier ring and the seal tends to augment the coning effect, thereby resulting in increased rotor dynamic instability.

What is needed, therefore, is a seal assembly that reduces or eliminates altogether the adverse effects of coning on a seal assembly.

SUMMARY

Embodiments of the disclosure may provide a seal assembly. The seal assembly may include an annular division wall having outside and inside surfaces, and a carrier ring disposed adjacent the inside surface of the annular division wall. The seal assembly may further include a sealing substrate metallurgically-bonded to an inner-most surface of the carrier ring, the sealing substrate forming a seal surface.

Embodiments of the disclosure may further provide a seal assembly for use in a casing of a turbomachine. The seal assembly may include an annular division wall having an outside surface and an inside surface, the outside surface being coupled to the casing, and a carrier ring disposed adjacent the inside surface of the annular division wall. The seal assembly may also include an abradable sealing substrate metallurgically-bonded to the carrier ring, and a seal surface formed into the abradable sealing substrate, the seal surface being disposed proximate a rotor and maintained substantially parallel thereto during operation of the turbomachine.

Embodiments of the disclosure may further provide a method of making a sealing assembly. The method may include metallurgically bonding an abradable material to a carrier ring having a high modulus of elasticity, and machining the abradable material to form a seal surface. The method may further include coupling the carrier ring to an annular division wall having a high modulus of elasticity.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
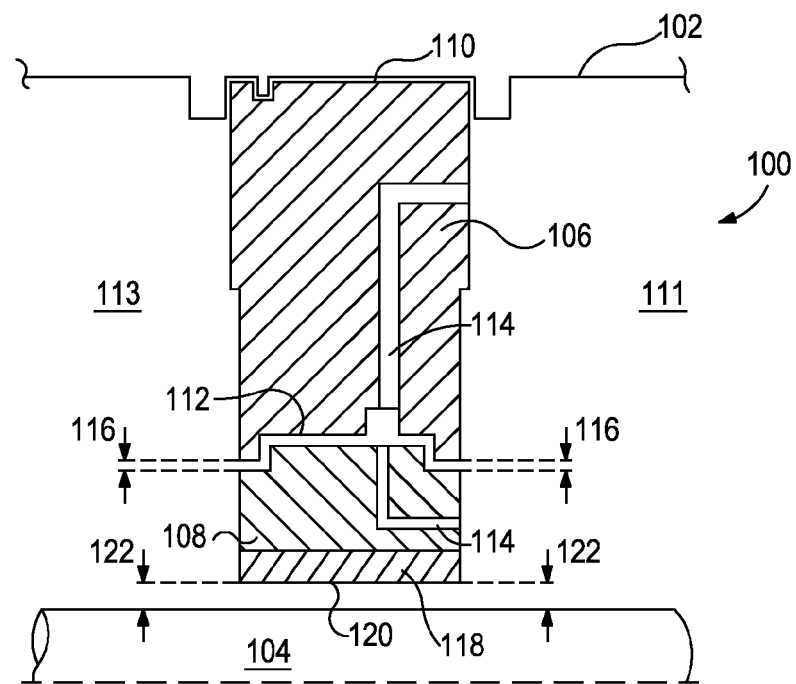
FIG. 1 illustrates an exemplary seal assembly, according to one or more embodiments of the present disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
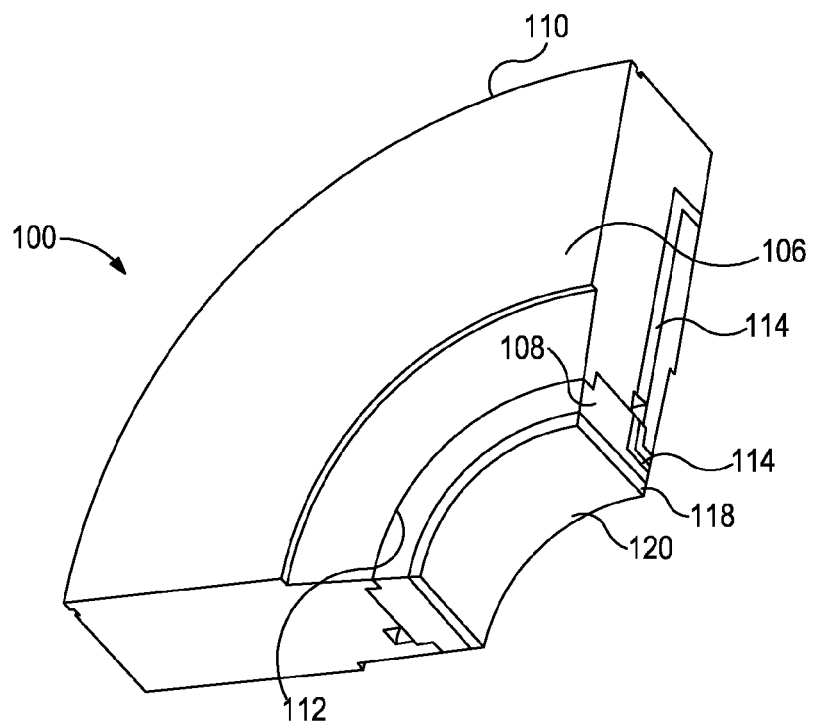
FIG. 2 illustrates a perspective view of a portion of the seal assembly of FIG. 1, according to one or more embodiments of the disclosure.

FIGS. 1 and 2 illustrate an exemplary seal assembly 100, according to one or more embodiments of the present disclosure. In at least one embodiment, the seal assembly 100 may be a division wall seal or a balance piston seal installed in a turbomachine, such as a centrifugal compressor, axial compressor, turbocharger, power turbine, steam turbine, or the like. As illustrated in FIG. 1, the seal assembly 100 may be disposed within a casing or housing 102 and may extend circumferentially about a rotor 104.

The seal assembly 100 may include an annular division wall 106 coupled to or forming part of the casing 102 at an outside diameter 110 of the division wall 106. The annular division wall 106 may be configured as an axial sealing face configured to separate a high pressure side 111 from a low pressure side 113. A carrier ring 108 may be coupled to or otherwise disposed adjacent an inside diameter 112 of the division wall 106. In at least one embodiment, the division wall 106 may define one or more gas conduits or shunt holes 114 that extend into the carrier ring 108. In operation, the shunt holes 114 may be configured to take high-pressure process gas from the high-pressure side 111 of the division wall 106 and inject it adjacent to the carrier ring 108 in order to prevent swirling of process gas between the carrier ring 108 and the rotor 104. As will be appreciated, this reduces the aerodynamic cross-coupling effects that may potentially affect rotor 104 stability.

In an exemplary embodiment, the division wall 106 and the carrier ring 108 may each be made of a material exhibiting a high modulus of elasticity, such as steel. In other embodiments, however, other high strength materials can be used such as, but not limited to, ferrous alloys, nickel alloys, titanium alloys, combinations thereof, or the like. In at least one embodiment, a high modulus of elasticity can range from about 100 GPa to about 300 GPa for the material used for the ring 108 and wall 106.

In one or more embodiments, a gap 116 may be defined between the inside diameter 112 of the division wall 106 and the carrier ring 108, thereby providing the carrier ring 108 with a small amount of "play" or "slack." It should be noted that the size of the gap 116 has been enhanced herein for illustrative purposes, but would generally be on the order of less than 10 thousandths of an inch or a few thousandths of an inch, if not less.

During operation, the play derived from the gap 116 may allow the carrier ring 108 to translate axially with respect to the rotor 104 in response to a pressure buildup on one side of the sealing assembly 100. The play may also provide for easier removal of the carrier ring 108, whereas a tighter interconnection between the carrier ring 108 and the division wall 106 would make removal and/or replacement more difficult or entirely impossible.

The sealing assembly 100 may also include a sealing substrate 118 having a seal surface 120 disposed proximate the rotor 104 and defining a clearance 122 therebetween. Again, it should be noted that the size of the clearance 122 has been enhanced herein for illustrative purposes, but it is generally known in the art that the clearance between a shaft and seal surface in turbomachinery is generally on the order of less than about 10 thousandths of an inch, if not less. The sealing substrate 118 may be coupled to or otherwise form part of the carrier ring 108, as will be described in more detail below. In at least one embodiment, the seal surface 120 may be disposed substantially parallel to the rotor 104 along its length. In one or more embodiments, the sealing substrate 118 may be made entirely of an abradable material having sufficient mechanical strength to withstand the pressure differentials that may exist across the seal surface 120. For example, the sealing substrate 118 can be made of materials such as, but not limited to, aluminum alloys, copper alloys, powder metal alloys, graphite-containing ferrous alloys, polymers, combinations thereof, or the like. As can be appreciated, such abradable materials may exhibit an advantageous rub tolerance such that, if the rotor 104 contacts the sealing substrate 118, the seal surface 120 will generally not damage or otherwise inhibit the rotor 104, and further, will maintain the sealing properties of the material.

The sealing substrate 118 may be chemically and/or metallurgically-bonded to the carrier ring 108, thereby eliminating any mechanical joint that may be established therebetween. As can be appreciated, eliminating the mechanical joint may serve to combine the stiffness of a high elastic modulus carrier ring 108 with the advantageous wear characteristics of an abradable sealing substrate 118. Thus, the overall seal assembly 100 is substantially stiffened over conventional seal assembly configurations, thereby reducing or completely eliminating the undesirable coning effect of the seal assembly 100 under higher operating pressures. With the reduction or elimination of coning, the seal surface 120 may also be provided with a greater capacity to maintain its parallel disposition with respect to the rotor 104 during operation, and reduce or eliminate undesirable rotor 104 vibrations caused by a divergent seal surface 120. Moreover, a stiffer seal assembly 100 may also support higher pressures between compression stages, thereby increasing overall machine efficiency and production.

In an exemplary embodiment, the sealing substrate 118 can be metallurgically-bonded to the carrier ring 108 via one or more hot isostatic pressing processes. For example, in one embodiment, the abradable sealing substrate 118 and the carrier ring 108 may be placed adjacent one another in a high-pressure containment vessel, where the sealing substrate 118 is nested within the inner-diameter surface of the carrier ring 108. While in the high-pressure containment vessel, the abradable sealing substrate 118 and carrier ring 108 may be subjected to both elevated temperature and isostatic gas pressure. The simultaneous application of heat and pressure eliminates internal voids and microporosity between the two components through a combination of plastic deformation, creep, and diffusion bonding. The result is the creation of a strong metallurgical metal-matrix composite bond. In another embodiment, hot isostatic pressing may be undertaken using powdered materials for a carrier ring 108 and a sealing substrate 118. The application of heat and pressure to the powdered materials may result in clean, homogeneous materials having a substantially uniform fine grain size at near 100% density, and the creation of a metal-matrix composite bond between the two materials.

In another exemplary embodiment, the sealing substrate 118 may be explosively clad to the carrier ring 108 to create a bi-metal plate and form a metal-matrix composite bond therebetween. For example, abradable material for the sealing substrate 118 may be explosively clad to a substantially planar carrier ring 108 substrate by using controlled detonations configured to force the two materials into a high-quality, metallurgically-bonded joint. The clad plate may then be rolled into a cylinder, with the abradable material on the inside diameter, and thereafter welded, brazed, or bonded into a cylinder exhibiting a high modulus of elasticity. In yet another embodiment, the cladding material, such as aluminum cladding material, may be placed inside a steel cylinder in the form of a ring and then explosively clad to the inside surface of the cylinder.

In a similar process, the sealing substrate 118 may be laser clad to the carrier ring 108 to form the metal-matrix composite bond. For example, a powder form of the abradable material for the sealing substrate 118 may be deposited onto a substantially planar carrier ring 108 substrate and simultaneously melted and consolidated using a laser in order to coat the substrate with the abradable material. The clad substrate may then be rolled into a cylinder, with the abradable material on the inside diameter, and thereafter welded, brazed, or bonded into a cylinder of high elastic modulus material.

In another exemplary embodiment, the sealing substrate 118 may be centrifugally cast onto the carrier ring 108, thereby forming a metal-matrix composite bond between the two materials. For example, the carrier ring 108 may first be placed in a casting machine and rotated about its axis. While rotating, a molten abradable material (e.g., the sealing substrate 118) is poured into the casting machine. The molten abradable material is centrifugally thrown towards the inside wall where the carrier ring 108 is disposed. After cooling, the molten abradable material solidifies, thereby forming an abradable inner surface to the carrier ring 108.

In yet other embodiments, the abradable sealing substrate 118 may be welded, brazed, or otherwise bonded to the carrier ring 108. As can be appreciated, the sealing substrate 118 may be welded, brazed, or otherwise bonded to either a full cylinder or a half shell of the carrier ring 108.

Once bonded to the carrier ring 108, the sealing substrate 118 may then be finish-machined to a final seal surface 120 configuration. For example, the sealing substrate 118 may be machined to form any number of seal surfaces 120, such as labyrinth teeth for labyrinth seals, perforations for hole-pattern seals, or an aerodynamic swirl break. In at least one embodiment, the abradable material of the sealing substrate 118 may be at least as thick as the labyrinth teeth and/or the depth of the perforations in a hole-pattern seal. In other embodiments, however, the sealing substrate 118 may be thinner than the tooth or perforation depth, but simultaneously thick enough so that the shaft 104 does not wear through the sealing substrate 118.

Figure 3:
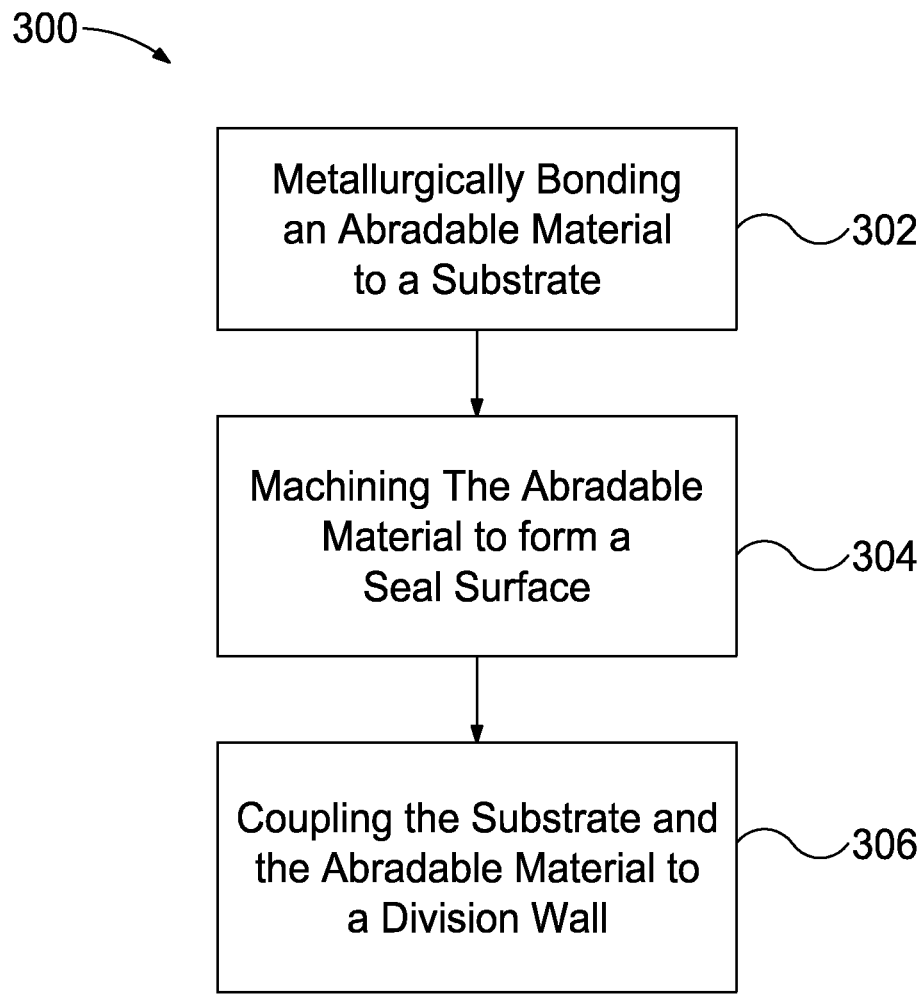
FIG. 3 illustrates a schematic flowchart of making a seal assembly, according to one or more embodiments of the disclosure.

FIG. 3, with continuing reference to FIGS. 1 and 2, illustrates an exemplary method 300 of manufacturing the sealing assembly 100, as generally described herein. The method 300 may include metallurgically bonding a layer of an abradable material to a substrate of high elastic modulus, as at 302. In at least one embodiment, the substrate may include the carrier ring 108, as described herein. The abradable material may then be machined to form the above noted seal surface 120, as at 304. The combination of the seal surface 120 and the substrate 118 may then be coupled to or otherwise disposed adjacent a division wall 106, as at 306. Once coupled to or otherwise disposed adjacent the division wall 106, there may be a small amount of play therebetween so as to allow the substrate 118 to translate axially with respect to an adjacent rotor 104. In this configuration, the seal assembly 100 may exhibit a high modulus of elasticity to prevent coning, but also provide an abradable surface that will not damage or otherwise inhibit the rotor 104.

Metallurgically or chemically bonding the sealing substrate 118 to the carrier ring 108 may eliminate any joint therebetween, thereby helping to reduce or eliminate coning of the seal assembly 100. Thus, the seal surface 120 may be maintained in a generally parallel disposition with respect to the rotor 104 during operation to reduce unwanted seal surface 120 divergence, which can lead to rotor dynamic instability.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A seal assembly, comprising:
   an annular division wall having an outside surface, an inside surface, a first axial end surface disposed adjacent a high-pressure side of the seal assembly, and a second axial end surface disposed adjacent a low-pressure side of the seal assembly;
   a carrier ring disposed adjacent the inside surface of the annular division wall; and
   a sealing substrate metallurgically-bonded to an innermost surface of the carrier ring, the sealing substrate forming a seal surface, wherein
   the first axial end surface of the annular division wall defines a first opening in direct fluid communication with the high-pressure side,
   the carrier ring defines a second opening in direct fluid communication with the high-pressure side of the seal assembly and radially offset from the first opening,
   the first opening and the second opening are in fluid communication via at least one gas conduit that extends through the annular division wall and the carrier ring, and
   the at least one gas conduit is configured to inject a high-pressure process gas from the high-pressure side of the seal assembly adjacent the carrier ring.

2. The seal assembly of claim 1, further comprising a gap defined between the inside surface of the annular division wall and the carrier ring, wherein the carrier ring is configured to translate axially in response to a pressure buildup on the high-pressure side of the seal assembly.

3. The seal assembly of claim 1, wherein the annular division wall and the carrier ring are made of a material exhibiting a high modulus of elasticity.

4. The seal assembly of claim 3, wherein the material is a ferrous alloy, a nickel alloy, or a titanium alloy.

5. The seal assembly of claim 1, wherein the sealing substrate is made of an abradable material.

6. The seal assembly of claim 5, wherein the abradable material is an aluminum alloy, a copper alloy, a powder metal alloy, a graphite-containing ferrous alloy, or a polymer.

7. The seal assembly of claim 1, wherein the sealing substrate is metallurgically-bonded to the carrier ring via hot isostatic pressing techniques.

8. The seal assembly of claim 1, wherein the sealing substrate is metallurgically-bonded to the carrier ring via explosive cladding or laser cladding.

9. The seal assembly of claim 1, wherein the sealing substrate is metallurgically-bonded to the carrier ring via centrifugal casting.

10. The seal assembly of claim 1, wherein the sealing substrate is metallurgically-bonded to the carrier ring by welding or brazing.

11. The seal assembly of claim 1, further comprising a balance piston seal.

12. A seal assembly, comprising:
    an annular division wall having an outside surface, coupled to a casing of a turbomachine, an inside surface, a first axial end surface disposed adjacent a high-pressure side of the seal assembly, and a second axial end surface disposed adjacent a low-pressure side of the seal assembly;

a carrier ring disposed adjacent the inside surface of the annular division wall;

an abradable sealing substrate metallurgically-bonded to the carrier ring; and a seal surface formed into the abradable sealing substrate, the seal surface being disposed proximate a rotor and maintained substantially parallel thereto during operation of the turbomachine, wherein the first axial end surface of the annular division wall defines a first opening in direct fluid communication with the high-pressure side, the carrier ring defines a second opening in direct fluid communication with the high-pressure side of the seal assembly, the second opening being axially aligned and radially offset from the first opening, the first opening and the second opening are in fluid communication via at least one gas conduit that extends through the annular division wall and the carrier ring, and the at least one gas conduit is configured to inject a high-pressure process gas from the high-pressure side of the seal assembly adjacent the carrier ring.

13. The seal assembly of claim 12, further comprising a gap defined between the inside surface of the annular division wall and the carrier ring, wherein the carrier ring is configured to translate axially with respect to the rotor in response to a pressure buildup on the high-pressure side of the seal assembly.

14. The seal assembly of claim 12, wherein the seal surface has teeth for a labyrinth seal or perforations for a hole-pattern seal.

15. The seal assembly of claim 12, wherein the annular division wall and the carrier ring are made of a ferrous alloy, a nickel alloy, or a titanium alloy.

16. The seal assembly of claim 12, wherein the abradable sealing substrate is made of an aluminum alloy, a copper alloy, a powder metal alloy, a graphite-containing ferrous alloy, or a polymer.

17. The seal assembly of claim 12, wherein the abradable sealing substrate is metallurgically-bonded to the carrier ring via hot isostatic pressing, explosive cladding, laser cladding, centrifugal casting, welding, or brazing.

* * * * *